United States Patent
Zhang et al.

(10) Patent No.: US 7,266,830 B2
(45) Date of Patent: Sep. 4, 2007

(54) LOCK MECHANISM FOR DIGITAL DISC PLAYER

(75) Inventors: Xiang-Hui Zhang, Shenzhen (CN); Shi-Kun Guo, Shenzhen (CN); Wen-Jie Bao, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 387 days.

(21) Appl. No.: 11/066,097

(22) Filed: Feb. 25, 2005

(65) Prior Publication Data

US 2006/0053430 A1 Mar. 9, 2006

(30) Foreign Application Priority Data

Sep. 8, 2004 (CN) .................... 2004 2 0083966

(51) Int. Cl.
*G11B 33/02* (2006.01)
(52) U.S. Cl. .................................................. 720/655
(58) Field of Classification Search ............. 720/655, 720/648, 652, 644, 649, 609, 651, 647, 706; 369/30.81; 360/97.01, 97.02
See application file for complete search history.

(56) References Cited

U.S. PATENT DOCUMENTS

2003/0174626 A1 * 9/2003 Joung ................... 369/75.1

FOREIGN PATENT DOCUMENTS

| CN | 99246438.2 | 10/1999 |
| CN | 02126550.X | 7/2002 |

* cited by examiner

*Primary Examiner*—Allen Cao
(74) *Attorney, Agent, or Firm*—Morris Manning & Martin LLP; Tim Tingkang Xia, Esq.

(57) ABSTRACT

A lock mechanism for a digital video player includes an elastic component, a switch, a main body, and a lid pivotally connected to the main body. The switch forms a switch button, a catch and a post for supporting the elastic component. The main body includes a cover and a housing. The cover defines a through hole thereon. The housing mounts at least one support for slideably supporting the switch, a stop plate connecting with the elastic component, and a second notch for accommodating the switch button. The lid mounts a hook on the bottom surface thereof corresponding to the through hole and being capable of hooking the catch when the lid is locked.

15 Claims, 3 Drawing Sheets

LOCK MECHANISM FOR DIGITAL DISC PLAYER

CROSS-REFERENCE TO RELATED APPLICATIONS

This application is related to a U.S. patent application entitled "OPENING ACTUATOR FOR VIDEO DISC PLAYER", recently filed with the same assignee as the instant application with Ser. No. 11/019,856. The disclosure of the above identified application is incorporated herein by reference.

BACKGROUND OF THE INVENTION

1. Field of the Invention

This invention is related to a digital disc player, and particularly to a lock mechanism for a hinged housing of a digital disc player.

2. Prior Art

In general, currently available lock mechanisms for digital disc players apply mechanical switches or electrical switches. Conventional lock mechanisms employ more than five components and have relatively complicated structures. The cost of the lock mechanism is unduly high. Chinese patent application no. CN02126550.X published on Sep. 23, 2003 discloses a lock mechanism for a digital disc player employing few components. The digital disc player using the lock mechanism comprises a main body, a lid pivotally connected to the main body, a pick-up head, a lock device, and a spring. The main body defines a hole on the top surface thereof, and a button is formed at one side of the main body. The lid has a hook fixed on a bottom surface thereof, the hook being receivable in the hole. A handspike extends from one side of the pick-up head. The lock device comprises a bulge, a plate, and a pitman for connecting the bulge and the plate. The spring is connected between the bulge and the plate, and is supported by the pitman. When closing the lid, the hook is forced into the hole and stopped by the bulge. When depressing the button, an electrical power supply is activated. The handspike is forced to move toward the lock device, and applies a force to the lock device. The lock device is forced to move in the same direction with the handspike. Therefore, the hook exits from the bulge and the lid is opened.

However, the lock mechanism disclosed in the above-mentioned art is driven by the pick-up head. The pick-up head may be affected badly.

SUMMARY OF THE INVENTION

Accordingly, an object of the present invention is to provide a lock mechanism for a digital video player with relatively few components and low cost, and which does not cause damage to other components of the digital video player.

To achieve the above-mentioned object, in one aspect of the present invention, a lock mechanism for a digital video player includes an elastic component, a switch, a main body, and a lid pivotally connected to the main body. The switch forms a switch button, a catch and a post for supporting the elastic component. The main body includes a cover and a housing. The cover defines a through hole thereon. The housing mounts at least one support for slideably supporting the switch, a stop plate connecting with the elastic component, and a second notch for accommodating the switch button. The lid mounts a hook on the bottom surface thereof corresponding to the through hole and being capable of hooking the catch when the lid is locked.

Other objects, advantages and novel features of the present invention will be drawn from the following detailed description of preferred embodiments of the present invention with the attached drawings, in which:

DETAILED DESCRIPTION OF THE INVENTION

Figure 1:
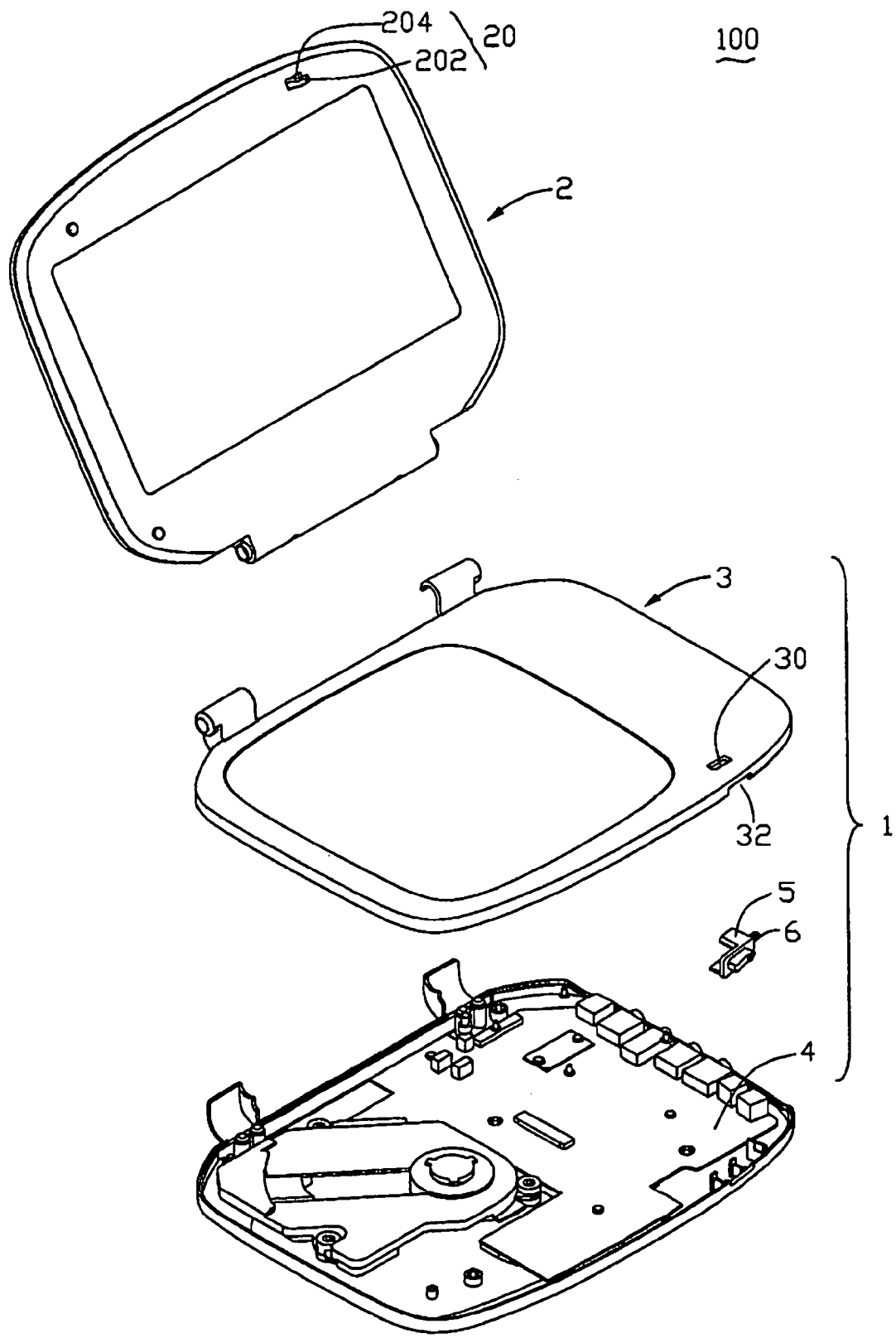
FIG. 1 is an exploded, isometric view of a digital video player with a lock mechanism in accordance with the preferred embodiment of the present invention.

Referring to FIG. 1, a digital video player 100 comprises a main body 1 and a lid 2. The lid 2 is pivotally connected to the main body 1 from the back edge thereof. A hook 20 is mounted on front edge of the lid 2. The hook 20 comprises a first catch 202, and a fixing portion 204 for fixing the hook 20 on the lid 2. The main body 1 comprises a cover 3, a housing 4, a switch 5, and an elastic component 6. The elastic component 6 may be a spring or another kind of elastic component. The cover 3 is connected to the housing 4 with known connectors such as screws. A through hole 30 is formed at the top surface of the cover 3 for receiving the first catch 202. A first notch 32 is formed at the side edge of the cover 3.

Figure 2:
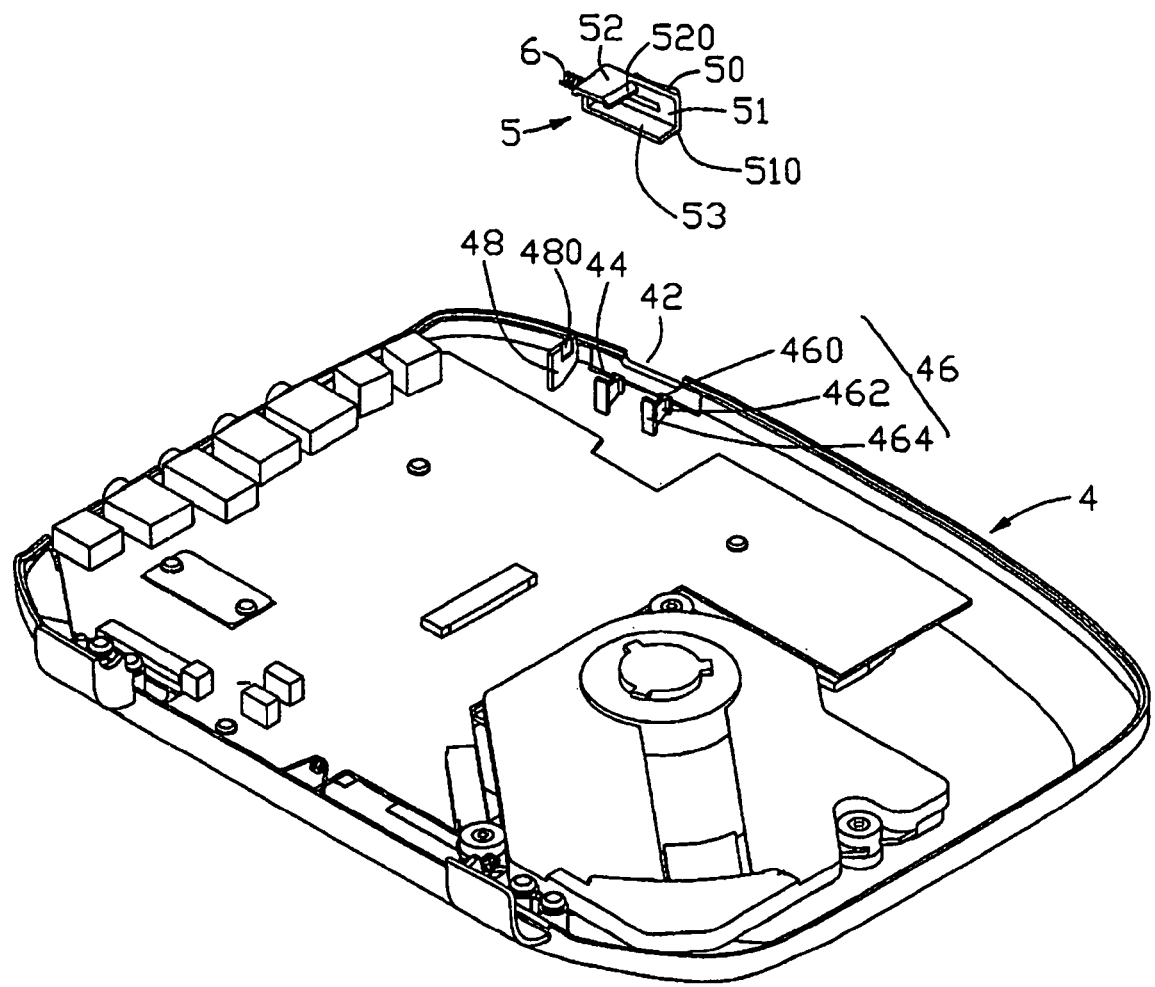
FIG. 2 is an exploded, isometric view of a housing, a switch and an elastic component of the digital video player of FIG. 1, viewed from another aspect.

Referring to FIG. 2, the housing 4 comprises a second notch 42 corresponding to the first notch 32 of the cover 3, a groove 44, at least one I-shaped support 46, and a stop plate 48. The groove 44 is defined on the housing 4 near the second notch 42. In the illustrated embodiment, two supports 46 are provided. The supports 46 are formed near the groove 44 for supporting the switch 5. Each support 46 comprises a first portion 460, a second portion 464, and a support portion 462 interconnecting the first and second portions 460, 464. The second portion 464 is higher than the first portion 460 and the support portion 462, which are at a same height. The stop plate 48 is mounted on the housing 4 aligning with the two supports 46. The stop plate 48 defines a recess 480 at the side near the supports 46.

Figure 3:
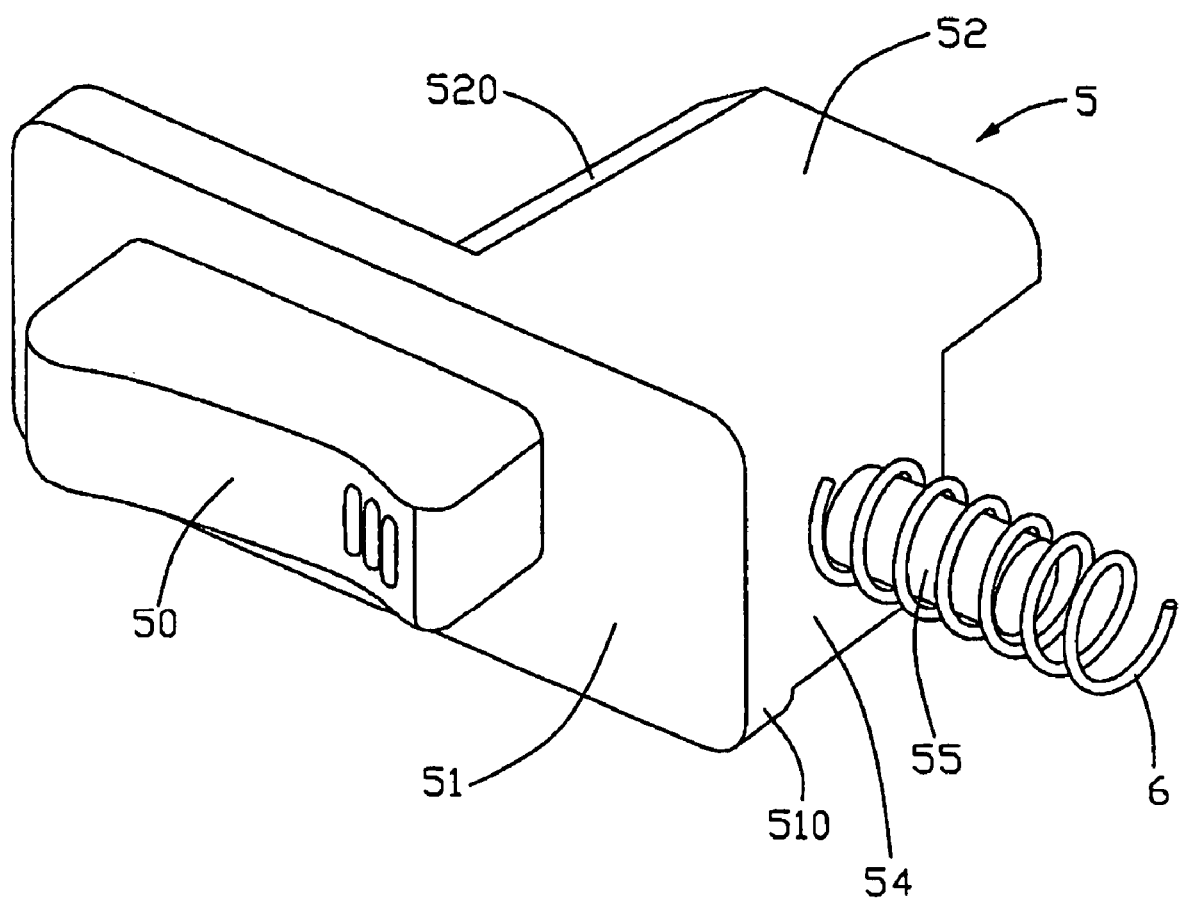
FIG. 3 is an enlarged, isometric view of the switch and the elastic component of the digital video player of FIG. 1, viewed from another aspect.

Referring also to FIG. 3, the switch 5 comprises a switch button 50, a vertical plate 51, a top plate 52, a bottom plate 53, a side plate 54, and a post 55 for supporting the elastic component 6. All the above-mentioned components of the switch 5 are integrally molded. The switch button 50 is formed on the vertical plate 51 and extends perpendicularly from one side thereof. The switch button 50 is capable of moving together with the vertical plate 51 in a parallel direction along the second notch 42. The top plate 52, the bottom plate 53 and the side plate 54 extend perpendicularly from the opposite side of the vertical plate 51. A second catch 520 extends downwardly from the side of the top plate 52 near the middle of the vertical plate 51, and corresponds to the first catch 202 of the hook 20. The bottom plate 53 divides the vertical plate 52 in a vertical direction into two parts. Therefore, a bottom edge 510 of the vertical plate 51 is formed below the bottom plate 53. The post 55 is formed from the center of the side plate 54, and extends perpendicularly from the side plate 54.

When the cover 3 is connected to the housing 4, the first notch 32 and the second notch 42 are integrated into a whole opening (not shown). The switch 5 is mounted on the housing 4 with the switch button 50 precisely located in the opening to expose itself out of an outer surface of the housing 4 and the cover 3 surrounding the opening. The bottom edge 510 of the vertical plate 51 is moveably restricted in the groove 44 by the first portions 460 of the supports 46. The bottom plate 53 is slideably laid on the support portion 462 of the supports 46, and is restricted to slide parallel with the second notch 42 by the second portions 464 of the supports 46. The end of the elastic component 6 is fitted in the recess 480.

The hook 20 is forced into the through hole 30 with the pressing down of the lid 2, and transmits a force to the second catch 520 of the switch 5. The switch 5 is forced to slide toward the stop plate 48 and the elastic component 6 is compressed. Therefore, the second catch 52 moves from its original position. The first catch 202 moves downwardly until it reaches the position below the second catch 520. The elastic component 6 is released and applies a force to the switch 5, so that the second catch 520 returns to its original position and the first catch 202 is hooked by the second catch 520. Thus, the lid 2 is locked.

When pushing the switch button 50 toward the stop plate 48, the elastic component 6 is forced to be compressed so that the switch 5 is forced to slide toward the stop plate 48. The second catch 520 moves from its original position, so that the first catch 202 exits from the second catch 520. Thus the lid 2 is opened.

The embodiment described herein is merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow and their equivalents.

What is claimed is:

1. A lock mechanism for a digital video player, comprising:
   an elastic component;
   a switch forming a switch button, a catch and a post for supporting the elastic component;
   a main body comprising a cover and a housing, the cover defining a through hole, the housing having at least one support for slideably supporting the switch, a stop plate connecting with the elastic component, and a first notch for accommodating the switch button; and
   a lid pivotally connected to the main body, the lid having a hook on a bottom surface thereof, the hook corresponding to the through hole and being capable of hooking the catch.

2. The lock mechanism for a digital video player as claimed in claim 1, wherein the support forms a first portion and second portion, the second portion being higher than the first portion, and the switch is restricted to slide parallel with the first notch on the first portion by the second portion.

3. The lock mechanism for a digital video player as claimed in claim 1, wherein the switch is integrally molded.

4. The lock mechanism for a digital video player as claimed in claim 1, wherein the switch forms a top plate, and the catch is formed at a side edge of the top plate.

5. The lock mechanism for a digital video player as claimed in claim 1, wherein the switch forms a vertical plate, and the switch button extends from one side of the vertical plate.

6. The lock mechanism for a digital video player as claimed in claim 5, wherein the switch forms a bottom plate perpendicularly extending from the vertical plate, the bottom plate being slideably supported by the support and capable of sliding parallel with the first notch.

7. The lock mechanism for a digital video player as claimed in claim 5, wherein the vertical plate forms a bottom edge below the bottom plate, the housing defines a groove corresponding to the bottom edge of the vertical plate, and the bottom edge is capable of sliding in the groove parallel with the first notch.

8. The lock mechanism for a digital video player as claimed in claim 6, wherein the switch forms a side plate extending perpendicularly up from the bottom plate, and the post is formed on a surface of the side plate.

9. The lock mechanism for a digital video player as claimed in claim 1, wherein the cover defines a second notch corresponding to the first notch, and the first notch together with the second notch forms an opening for accommodating the switch button.

10. The lock mechanism for a digital video player as claimed in claim 1, wherein the stop plate defines a recess, and the post is fitted in the recess.

11. The lock mechanism for a digital video player as claimed in claim 1, wherein the switch button moves parallel with the first notch.

12. The lock mechanism for a digital video player as claimed in claim 1, wherein the hook is forced into the through hole and hooks the catch of the switch when the lid is locked.

13. The lock mechanism for a digital video player as claimed in claim 1, wherein the switch is forced to move toward the stop plate with pushing of the switch button toward the stop plate, and then the hook exits from the catch, whereby the cover is opened.

14. A player, comprising:
   a main body enclosing said player;
   a lid movably attached to said main body and movable between in a close position where said lid is parallel disposed beside said main body to cover a portion of said main body, and an open position where said lid is moved away to expose said covered portion of said main body, said lid having a first catch formed thereon and extending toward said main body; and
   a switch disposed in said main body, and having a second catch approachable by said first catch of said lid and engagable with said first catch of said lid in order to fix said lid in case that said lid is moved to said close position, said switch being resiliently movable along a direction parallel to an outer surface of said main body so as to move said second catch for disengaging from said first catch of said lid and allow said lid to be freely movable from said close position to said open position.

15. A method for operating a player, comprising the steps of:
   providing a main body enclosing said player;
   pivotally attaching a lid to said main body to have said lid pivotally movable between a close position to cover a portion of said main body and an open position to expose said covered portion of said main body;

forming a first catch on said lid;
disposing a switch having a second catch partially in said main body corresponding to said first catch so that engagement of said first and second catches confines movement of said lid in case that said lid is in said close position; and
allowing movement of said switch without further entry thereof into said main body in order to urge said second catch disengaging from said first catch for releasing said lid in case that said lid is in said close position.

* * * * *